(No Model.)

A. W. BYERS & J. C. DORSER.
Cotton Planter.

No. 233,725. Patented Oct. 26, 1880.

WITNESSES:
Chas. Nidq
C. Sedgwick

INVENTOR:
A. W. Byers
J. C. Dorser
BY Munn &Co
ATTORNEYS.

UNITED STATES PATENT OFFICE.

ANTHONY W. BYERS AND JAMES C. DORSER, OF SHERMAN, TEXAS.

COTTON-PLANTER.

SPECIFICATION forming part of Letters Patent No. 233,725, dated October 26, 1880.

Application filed March 18, 1880. (No model.)

*To all whom it may concern:*

Be it known that we, ANTHONY WALTER BYERS and JAMES CARROL DORSER, of Sherman, in the county of Grayson and State of Texas, have invented a new and useful Improvement in Cotton-Planters, of which the following is a specification.

Figure 1:
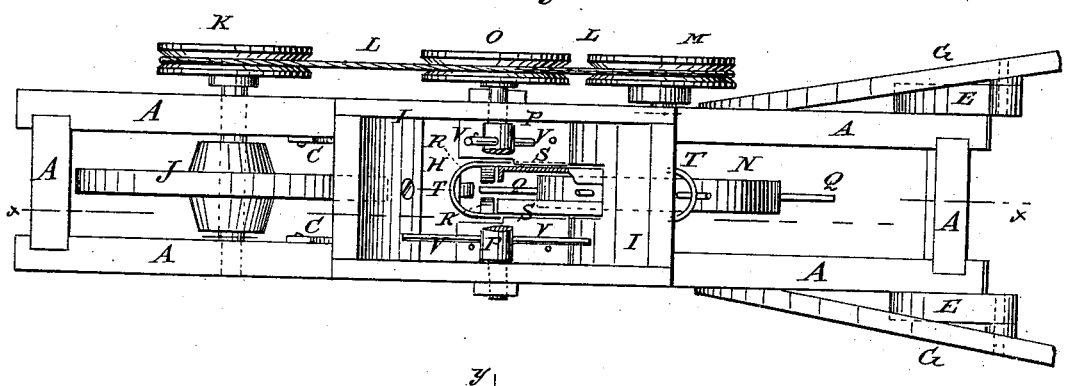
Figure 2:
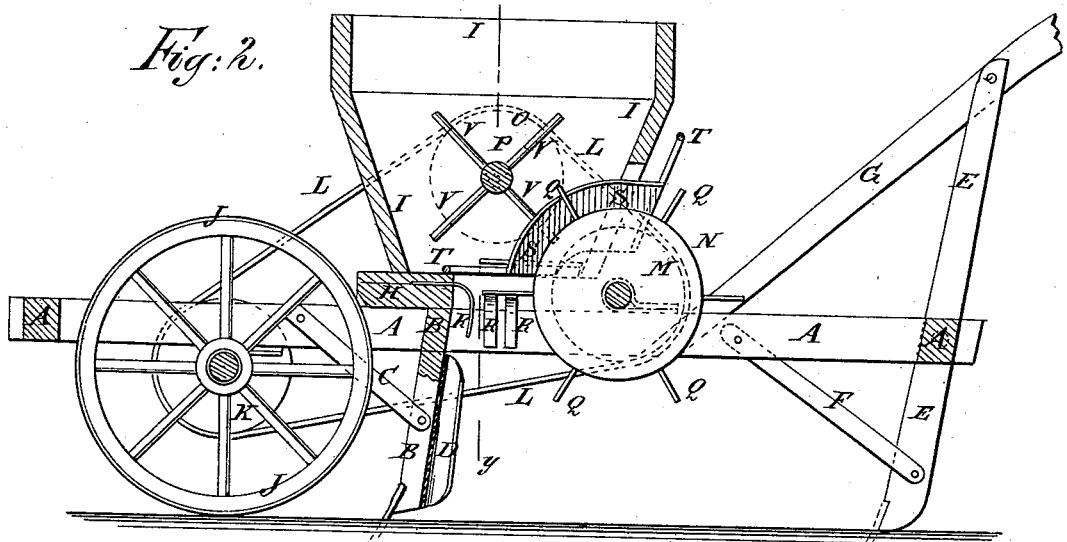
Figure 3:
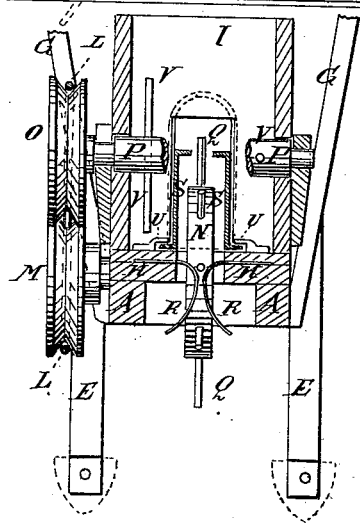

Figure 1 is a plan view of the improvement. Fig. 2 is a sectional side elevation taken through the line $x\ x$, Fig. 1. Fig. 3 is a sectional end elevation taken through the line $y\ y$, Fig. 2.

Similar letters of reference indicate corresponding parts.

The object of this invention is to furnish cotton-planters so constructed that they can be adjusted to plant less or more seed, as required.

A is the frame of the planter, which is formed of two long side bars connected at their ends by two short cross-bars. To and between the middle parts of the side bars of the frame A is attached the upper end of a standard, B, upon the lower end of which is formed a seat for a plow to open a furrow to receive the seed. The standard B is supported against the draft strain by inclined braces C, attached to it and to the side bars of the frame A.

To the rear side of the standard B is attached a spout, D, to guide the seed into the furrow opened by the plow. The spout D is open upon the rear side, so that the operator can see the seed as it falls, and can thus know if the machine is working properly.

To the rear ends of the side bars of the frame A are attached standards E, upon the lower ends of which are formed seats to receive plows for covering the seed. The draft strain upon the standards E is sustained by inclined braces F, attached to them and to the side bars of the frame A. To the upper ends of the standards E are attached the handles G, the forward ends of which are attached to the side bars of the frame A. To the middle part of the side bars of the frame A is attached the feed-board H, which is screwed or nailed to the side bars, A, and serves also as a bottom for the hopper I, and to which the said hopper is attached.

J is the drive-wheel, which is placed between the forward parts of the side bars of the frame A, and its journals revolve in bearings attached to the said side bars. One of the journals of the drive-wheel J projects, and to it is attached a pulley or chain-wheel, K, around which passes an endless band or chain, L. The endless band or chain L also passes around a pulley or chain-wheel, M, attached to the journal of the feed-wheel N, and over a pulley or chain-wheel, O, attached to the journal of the agitator P. The journals of the feed-wheel N revolve in bearings attached to the side bars of the frame A in such positions that the forward part of the said feed-wheel may pass through and work in a slot in the lower part of the rear side of the hopper I and a slot in the rear part of the feed-board H, so that the spikes or prongs Q, attached to the rim of the said feed-wheel N, may take hold of the cotton-seeds and draw them out between curved steel springs fixed in the slot in the bottom of the said feed-board or bottom of hopper.

To the feed-board H, at the sides and forward end of its slot, are attached springs R, which are curved downward and outward in such a manner that their bends may meet, or nearly meet, within the said slot, so as to prevent the seeds from passing out except when pushed out by the prongs Q of the feed-wheel N, and thus prevent the seeds from being dropped in bunches. The outward curve of the ends of the springs R allows the seeds to drop from them freely, and allows the prongs Q of the feed-wheel N to pass up between the said springs R should the said feed-wheel be turned backward.

S are two sections of ring-plates placed upon the opposite sides of the feed-wheel N, and connected at their ends by rods T. The forward ends of the plates S rest, fit, and slide upon the feed-board or bottom of hopper at the opposite sides of its slot, and have outwardly-projecting flanges U formed upon them to enter grooves in the feed-board or bottom of hopper to keep the said plates S in place.

The curved outer edges of the plates S have inwardly-projecting flanges formed upon them, which overlap the rim of the feed-wheel N, sufficient space being left between the said flanges for the passage of the prongs Q, but not enough for the passage of the seed. With this construction the gage-plates S may be pushed forward or drawn back to adjust the machine to plant less or more seed, as may be desired.

The agitator P is formed by attaching radial prongs, pins, or fingers V to a shaft, the journals of which revolve in bearings in the sides of the hopper I.

The pins V of the agitator P are arranged to work upon the opposite sides of the forward part of the feed-wheel N, so as to keep the seeds stirred up, and at the same time push the seeds into such a position that the prongs Q of the feed-wheel N will take hold of and push them out between the steel springs fixed in the slot in the feed-board or bottom of hopper. By driving the feed-wheel N and the agitator P by the same band or chain the upper part of the feed-wheel and the lower part of the agitator will be made to move in opposite directions, as they are required to do, to properly discharge the seed.

Having thus described our invention, we claim as new and desire to secure by Letters Patent—

The combination of the slotted hopper I, the slotted feed-board H, having springs R, and the spiked feed-wheel N, having prongs Q and curved plates S, connected by rods T, as shown and described.

ANTHONY WALTER BYERS.
JAMES CARROL DORSER.

Witnesses:
E. M. MEARS,
J. H. DILLS.